Figure 1:
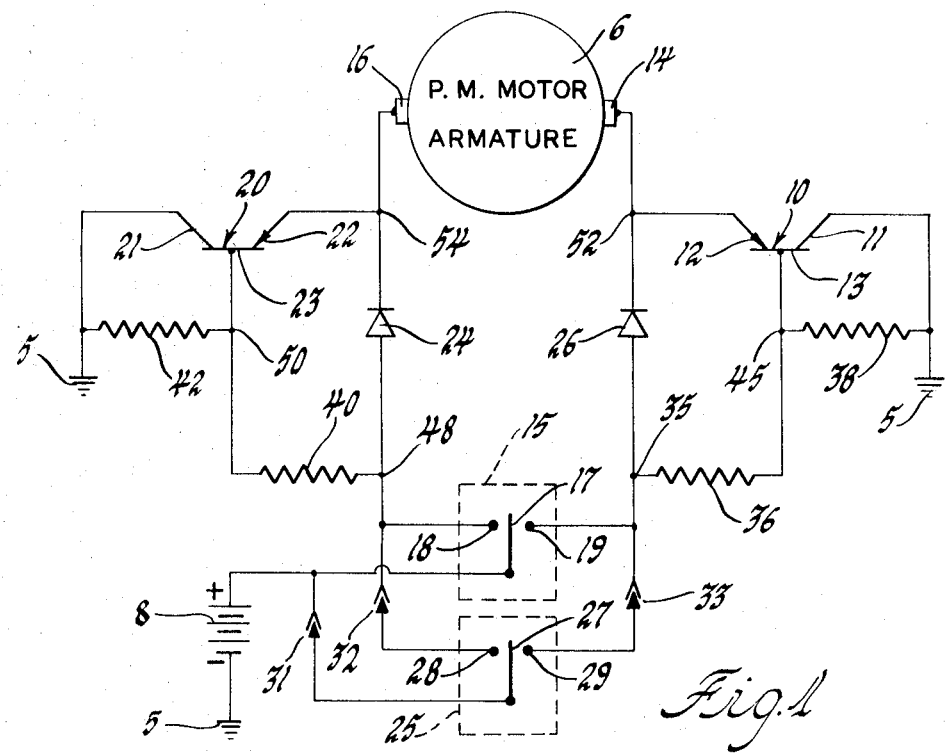

United States Patent

[11] 3,568,024

| [72] | Inventor | Samuel B. Robbins |
| | | Rochester, Mich. |
| [21] | Appl. No. | 744,810 |
| [22] | Filed | July 15, 1968 |
| [45] | Patented | Mar. 2, 1971 |
| [73] | Assignee | General Motors Corporation |
| | | Detroit, Mich. |

[54] REVERSING CONTROL FOR PERMANENT MAGNET TYPE DIRECT CURRENT ELECTRIC MOTORS
3 Claims, 2 Drawing Figs.

[52] U.S. Cl. .................................................. 318/257,
    318/280, 318/293
[51] Int. Cl. ...................................................... H02p 1/22
[50] Field of Search ........................................... 318/280,
    291, 293, 257

[56] References Cited
UNITED STATES PATENTS

| 2,976,469 | 3/1961 | Christiano .................... | 318/293 |
| 3,022,454 | 2/1962 | Millis ............................ | 318/293 |
| 3,054,924 | 9/1962 | Wetzger et al. ............... | 318/293 |
| 3,471,103 | 10/1969 | Gabor .......................... | 318/293 |
| 3,143,695 | 8/1964 | Hohne, Jr. et al. ............ | 318/257 |

Primary Examiner—Milton O. Hirshfield
Assistant Examiner—K. L. Crosson
Attorneys—Warren E. Finken and Richard G. Stahr ABSTRACT: A control for selectively reversing the direction of rotation of the armature of a permanent magnet type direct current electric motors. The movable contact of a single pole, double throw switch is connected to one terminal of a direct current supply potential source and each stationary contact thereof is connected to a respective opposite side of the motor armature. The current carrying electrodes of respective transistors are connected across opposite sides of the motor armature and the other polarity terminal of the direct current supply potential source. With the movable contact of the switch closed to either stationary contact, the transistor connecting the opposite side of the armature with the other terminal of the direct-current supply potential source is biased conductive to complete an energizing circuit for the motor through the current carrying electrodes thereof.

PATENTED MAR 2 1971  3,568,024

INVENTOR.
Samuel B. Robbins
BY
Richard G. Stahr
ATTORNEY

REVERSING CONTROL FOR PERMANENT MAGNET TYPE DIRECT CURRENT ELECTRIC MOTORS

This invention is directed to reversing controls for electric motors and, more specifically, to a control for selectively reversing the direction of rotation of the armature of a permanent magnet type direct-current electric motor.

Current solid state reversing controls for permanent magnet type electric motors require four transistors. To reduce expense and increase reliability, a reduction in the number of transistors employed to effect reversal of a permanent magnet type direct current electric motor is desirable.

It is, therefore, an object of this invention to provide an improved reversing control for permanent magnet type direct current electric motors.

It is another object of this invention to provide an improved solid state reversing control for permanent magnet type direct-current electric motors employing only two transistors.

In accordance with this invention, a reversing control for selectively reversing the direction of rotation of the armature of a permanent magnet type direct-current electric motor is provided wherein a source of direct-current supply potential may be selectively connected across one side of the motor armature and the current carrying electrodes of a transistor, connected in series between the opposite side of the armature and the direct-current supply potential source, or across the other side of the motor armature and the current carrying electrodes of another transistor, connected in series between the first side of the armature and the direct-current supply potential source.

Figure 2:
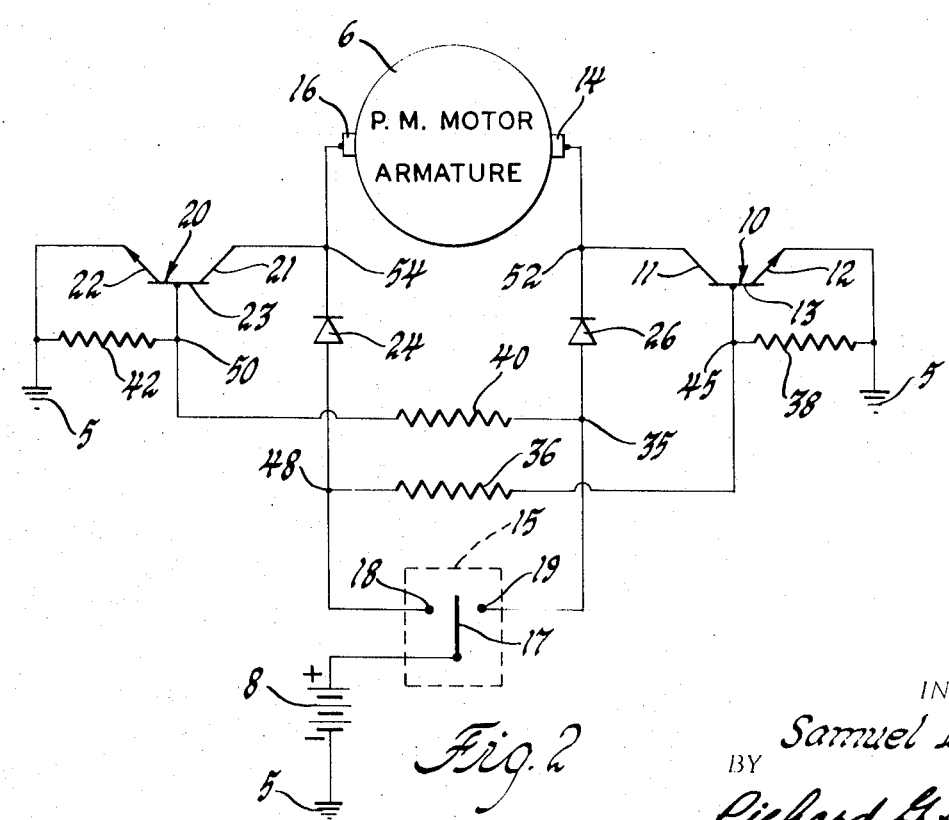

For a better understanding of the present invention, together with additional objects, advantages and features thereof, reference is made to the following description and accompanying drawing in which:

FIG. 1 schematically sets forth one embodiment of the reversing control circuit of this invention and;

FIG. 2 schematically sets forth an alternate embodiment of the reversing control circuit of this invention employing opposite conductivity type transistors.

In both FIGS. of the drawing, like elements have been given like characters of reference.

As the point of reference or ground potential is the same point electrically throughout the system, it has been schematically represented by the accepted symbol and referenced by the numeral 5 throughout the drawing.

Referring to the FIGS., the reversing control of this invention for selectively reversing the direction of rotation of the armature 6 of a permanent magnet type direct-current electric motor is shown in combination with a direct-current supply potential source 8 having positive and negative polarity terminals. In the FIGS., the direct-current supply potential source 8 is schematically represented as a battery. It is to be specifically understood, however, that any other suitable direct current potential source may be employed.

The solid state reversing control circuit of this invention includes first and second transistors each having two current carrying electrodes and a base electrode with one of the current carrying electrodes of the first transistor connected to a selected first side of the motor armature and the like one current carrying electrode of the second transistor connected to the opposite side of the motor armature, an electrical switch for selectively independently connecting the direct current supply potential source across the series combination of the motor armature and the current carrying electrodes of the first transistor and the series combination of the motor armature and the current carrying electrodes of the second transistor and first and second transistor bias circuits electrically interconnected with the first and second transistors, respectively, in such a manner that the first transistor is biased conductive when the direct-current supply potential source is connected across the series combination of the motor armature and the current carrying electrodes of the first transistor and the second transistor is biased conductive when the direct current supply potential source is connected across the series combination of the motor armature and the current carrying electrodes of the second transistor.

The electrical switch may be a conventional single pole double throw switch 15 having a movable contact 17 and two stationary contacts 18 and 19. In the FIGS., movable contact 17 is indicated to be connected to the positive polarity terminal of direct current supply potential source 8 and is operable to a first position to engage and to establish electrical contact with stationary contact 18 and to a second position to engage and to establish electrical contact with stationary contact 19. If desired, switch 15 may be a three position switch having a third open position, as illustrated in the FIGS.

As movable contact 17 of switch 15 is shown in the FIGS. to be connected to the positive polarity terminal of direct current supply potential source 8, in FIG. 1, the emitter electrodes 12 and 22 of type PNP transistors 10 and 20, respectively, are connected to respective brushes 14 and 16, in electrical contact with motor armature 6, and in FIG. 2, collector electrodes 11 and 21 of type NPN transistors 10 and 20, respectively, are connected to respective brushes 14 and 16.

The current carrying electrodes, emitter electrode 11 and collector electrode 12, of transistor 10 are connected across one side of armature 6 and the other polarity terminal of direct current supply potential source 8 through point of reference or ground potential 5 and the current carrying electrodes, emitter electrode 22 and collector electrode 21, of transistor 20 are connected across the other side of armature 6 and the other polarity terminal of direct-current supply potential source 8 through point of reference or ground potential 5.

To maintain the second transistor 20 nonconductive when the first transistor 10 is conducting with movable contact 17 of switch 15 in the first position engaging stationary contact 18 and to maintain the first transistor 10 nonconductive when the second transistor 20 is conducting with movable contact 17 of switch 15 in the second position engaging stationary contact 19, first and second diodes are provided. One diode is connected between one of the stationary contacts of switch 15 and one side of the motor armature and poled for forward conduction therethrough and the second diode is connected between the other one of the stationary contacts of switch 15 and the other side of armature 6 and poled for forward conduction therethrough. In the FIGS., first diode 24 is connected between stationary contact 18 of switch 15 and brush 16 and second diode 26 is connected between stationary contact 19 of switch 15 and brush 14. As the positive polarity terminal of direct current supply potential source 8 is indicated to be connected to the movable contact 17 of switch 15 in the FIGS., the anode electrode of each of diodes 24 and 26 is connected to the respective stationary contact of switch 15.

First and second transistor bias circuits electrically interconnected with the first and second transistors, respectively, in such a manner that the first transistor is biased conductive when the direct current supply potential source is connected across the series combination of the motor armature and the current carrying electrodes of the first transistor and the second transistor is biased conductive when the direct-current supply potential source is connected across the series combination of the motor armature and the current carrying electrodes of the second transistor, are provided.

In FIG. 1, the series combination of resistors 36 and 38 is connected across junction 35 between the second diode 26 and the stationary contact 19 of switch 15 to which it is connected and the other polarity terminal of direct-current supply potential source 8 through point of reference or ground potential 5 and the series combination of resistors 40 and 42 is connected across junction 48 between the first diode 24 and stationary contact 18 of switch 15 to which it is connected and the other polarity terminal of direct-current supply potential source 8 through point of reference or ground potential 5. The current carrying electrodes of the first transistor 10, emitter electrode 12 and collector electrode 11, are connected across the side of motor armature 6 to which the second diode 26 is connected through brush 14 and the other polarity terminal of direct-current supply potential source 8 through point of reference or ground potential 5 and the current carrying electrodes of the second transistor 20, emitter electrode 22 and collector electrode 21, are connected across the other side of motor armature 6 through brush 16 and the other polarity terminal of direct current supply potential source 8 through point of reference or ground potential 5. The base electrode 13 of transistor 10 is connected to junction 45 between series resistors 36 and 38 and the base electrode 23 of transistor 20 is connected to junction 50 between series resistors 40 and 42.

In FIG. 2, the series combination of resistors 36 and 38 are connected across junction 48 between the first diode 24 and the stationary contact 18 of switch 15 to which it is connected and the other polarity terminal of direct-current supply potential source 8 through point of reference or ground potential 5 and the series combination of resistors 40 and 42 is connected across junction 35 between the second diode 26 and stationary contact 19 of switch 15 to which it is connected and the other polarity terminal of direct-current supply potential source 8 through point of reference or ground potential 5. The current carrying electrodes of the first transistor 10, collector electrode 11 and emitter electrode 12, are connected across the side of the motor armature 6 to which the second diode 26 is connected through brush 14 and the other polarity terminal of direct current supply potential source 8 through point of reference or ground potential 5 and the current carrying electrodes of the second transistor 20, collector electrode 21 and emitter electrode 22, are connected across the other side of motor armature 6 through brush 16 and the other polarity terminal of direct-current supply potential source 8 through point of reference or ground potential 5. The base electrode 13 of transistor 10 is connected to junction 45 between series resistors 36 and 38 and the base electrode 23 of transistor 20 is connected to junction 50 between series resistors 40 and 42.

Referring to FIG. 1, with movable contact 17 of switch 15 in electrical engagement with stationary contact 18, direct-current supply potential source 8 is connected across the series combination of armature 6 and the current carrying electrodes of the first transistor 10, emitter electrode 12 and collector electrode 11, through first diode 24, brushes 16 and 14 and point of reference or ground potential 5. The potential of junction 52 is of a positive polarity with respect to point of reference or ground potential 5 which reverse biases the second diode 26. As the end of resistor 36 connected to junction 35 is electrically open with diode 26 reverse biased, this resistor is removed from the circuit, therefore, the base electrode 13 of transistor 10 is connected to point of reference or ground potential 5 through resistor 38. The positive polarity potential with respect to that of point of reference or ground potential 5 upon junction 52 is applied across the emitter-base electrodes of transistor 10 and is of the correct polarity relationship to produce emitter-base current flow through this type PNP transistor. Therefore, as the potential present upon junction 52 is of a positive polarity with respect to point of reference or ground potential 5, transistor 10 conducts through the emitter-collector electrodes thereof to complete an energizing circuit for current flow through motor armature 6 which may be traced from the positive polarity terminal of direct current supply potential source 8, through movable contact 17 of switch 15, stationary contact 18, diode 24, brush 16, armature 6, brush 14, the emitter-collector electrodes of transistor 10 and point of reference or ground potential 5 to the negative polarity terminal of direct-current supply potential source 8. Series resistors 40 and 42 are also connected across direct-current supply potential source 8 through movable contact 17 of switch 15 and stationary contact 18, consequently, there is a current flow therethrough. Resistor 40 is selected to be of an ohmic value which will produce a potential drop thereacross which is less than the forward potential drop across diode 24. Therefore, the potential of junction 54, applied to emitter electrode 22 of transistor 20, is less positive than the potential of junction 50, applied to base electrode 23 of transistor 20. As this emitter-base potential relationship does not satisfy the emitter-base bias requirements to produce emitter-base current flow through a type PNP transistor, transistor 20 is maintained nonconductive by diode 24. Consequently, the motor armature 6 revolves in a first direction.

With movable contact 17 of switch 15 in electrical engagement with stationary contact 19, direct-current supply potential source 8 is connected across the series combination of armature 6 and the current carrying electrodes of the second transistor 20, emitter electrode 22 and collector electrode 21, through second diode 26, brushes 14 and 16 and point of reference or ground potential 5. The potential of junction 54 is of a positive polarity with respect to point of reference or ground potential 5 which reverse biases the first diode 24. As the end of resistor 40 connected to junction 48 is electrically open with diode 24 reverse biased, this resistor is removed from the circuit, therefore, the base electrode 23 of transistor 20 is connected to point of reference or ground potential 5 through resistor 42. The positive polarity potential with respect to that of point of reference or ground potential 5 upon junction 54 is applied across the emitter-base electrodes of transistor 20 and is of the correct polarity relationship to produce emitter-base current flow through this type PNP transistor. Therefore, as the potential upon junction 54 is of a positive polarity with respect to point of reference or ground potential 5, transistor 20 conducts through the emitter-collector electrodes thereof to complete an energizing circuit for current flow in the opposite direction through motor armature 6 which may be traced from the positive polarity terminal of direct-current supply potential source 8 through movable contact 17 of switch 15, stationary contact 19, diode 26, brush 14, armature 6, brush 16, the emitter-collector electrodes of transistor 20 and point of reference or ground potential 5 to the negative polarity terminal of direct current supply potential source 8. Series resistors 36 and 38 are also connected across direct-current supply potential source 8 through movable contact 17 of switch 15 and stationary contact 19, consequently, there is current flow therethrough. Resistor 36 is selected to be of an ohmic value which will produce a potential drop thereacross which is less than the forward potential drop across diode 26. Therefore, the potential of junction 52, applied to emitter electrode 12 of transistor 10, is less positive than the potential of junction 45, applied to base electrode 13 of transistor 10. As this emitter-base potential relationship does not satisfy the emitter-base bias requirements to produce emitter-base current flow through a type PNP transistor, transistor 10 is maintained nonconductive by diode 26. Consequently, the motor armature 6 revolves in a second direction.

A second single pole double throw switch 25 having a movable contact 27 and two stationary contacts 28 and 29 and connected as indicated in the drawing, may be used with the circuit of FIG. 1 to provide for the operation of motor 6 from separate locations. The proper connections are indicated in the FIG. by schematic representations of electrical connectors referenced by numerals 31, 32 and 33. With the movable contacts of switches 15 and 25 in opposite positions, both transistors 10 and 20 are biased nonconductive. However, with the movable contacts of switches 15 and 25 in the same position contacting corresponding stationary contacts, the armature of motor 6 will revolve in the direction as determined by the stationary contacts so contacted.

Referring to FIG. 2, with movable contact 17 of switch 15 in electrical engagement with stationary contact 18, direct current supply potential source 8 is connected across the series combination of armature 6 and the current carrying electrodes of the first transistor 10, collector electrode 11 and emitter electrode 12, through diode 24, brushes 16 and 14 and point of reference or ground potential 5. Series resistors 36 and 38 are also connected across direct current supply potential source 8 through movable contact 17 of switch 15 and stationary contact 18, consequently, there is a current flow therethrough. The potential of junction 45, therefore, applied to base electrode 13 of transistor 10, is of a positive polarity with respect to that of point of reference or ground potential 5, applied to emitter electrode 12 of transistor 10. As this base-emitter polarity relationship satisfies the base-emitter bias requirements to produce base-emitter current flow through a type NPN transistor, and since the potential of junction 52 is of a positive polarity with respect to point of reference or ground potential 5, transistor 10 conducts through the collector-emitter electrodes thereof to complete an energizing circuit for current flow through motor armature 6 which may be traced from the positive polarity terminal of direct current supply potential source 8, through movable contact 17 of switch 15, stationary contact 18, diode 24, brush 16, armature 6, brush 14, the collector-emitter electrodes of transistor 10 and point of reference or ground potential 5 to the negative polarity terminal of direct current supply potential source 8. The positive polarity potential upon junction 52 with respect to that of point of reference or ground potential 5 reverse biases diode 26. Therefore, the end of series resistors 40 and 42 connected to junction 35 is electrically open. With this circuit electrically open, there is no difference potential across the base-emitter electrodes of transistor 20, therefore, this transistor is maintained nonconductive by diode 26. Consequently, the motor armature 6 revolves in a first direction. With movable contact 17 of switch 18 in electrical engagement with stationary contact 19, direct current supply potential source 8 is connected across the series combination of armature 6 and the current carrying electrodes of the second transistor 20, collector electrode 21 and emitter electrode 22, through diode 26, brushes 14 and 16 and point of reference or ground potential 5. Series resistors 40 and 42 are also connected across direct current supply potential source 8 through movable contact 17 of switch 15 and stationary contact 19, consequently, there is a current flow therethrough. The potential of junction 50, therefore, applied to base electrode 23 of transistor 20, is of a positive polarity with respect to that of point of reference or ground potential 5, applied to emitter electrode 22 of transistor 20. As this base-emitter polarity relationship satisfies the base-emitter bias requirement to produce base-emitter current flow through a type NPN transistor, and since the potential of junction 54 is of a positive polarity with respect to point of reference or ground potential 5, transistor 20 conducts through the collector-emitter electrodes thereof to complete an energizing circuit for current flow through motor armature 6 which may be traced from the positive polarity terminal of direct-current supply potential source 8, through movable contact 17 of switch 15, stationary contact 19, diode 26, brush 14, armature 6, brush 16, the collector-emitter electrodes of transistor 20 and point of reference or ground potential 5 to the negative polarity terminal of direct current supply potential source 8. The positive polarity potential upon junction 54 with respect to that of point of reference or ground potential 5 reverse biases diode 24. Therefore, the end of series resistors 36 and 38 connected to junction 48 is electrically open. With this circuit electrically open, there is no difference potential across the base-emitter electrodes of transistor 10, therefore, this transistor is maintained nonconductive by diode 24. Consequently, the motor armature 6 revolves in the reverse first direction.

While specific polarities, transistor types and electrode connections have been set forth in this specification, it is to be specifically understood that other transistor types and compatible polarities may be employed without departing from the spirit of the invention.

While a preferred embodiment of the present invention has been disclosed and described, it will be obvious to those skilled in the art that various modifications and substitutions may be made without departing from the spirit of the invention which is to be limited only within the scope of the appended claims.

I claim:

1. A reversing control for selectively reversing the direction of rotation of the armature of a permanent magnet type direct current electric motor comprising in combination with a direct-current supply potential source having positive and negative polarity terminals, a single pole, double throw electric switch having two stationary contacts and a movable contact operable to a first position to engage and establish electrical contact with one of said stationary contacts and to a second position to engage and establish electrical contact with the other one of said stationary contacts, means for connecting said movable contact to a selected one polarity terminal of said direct current supply potential source, first and second transistors each having two current carrying electrodes and a base electrode, means for connecting said current carrying electrodes of said first transistor across one side of said armature and the other polarity terminal of said direct current supply potential source, means for connecting said current carrying electrodes of said second transistor across the other side of said armature and the same polarity terminal of said direct-current supply potential source, first and second diodes, means for connecting said first diode between one of said stationary contacts of said electric switch and one side of said motor armature and poled for forward conduction therethrough, means for connecting said second diode between the other one of said stationary contacts and the other side of said armature and poled for forward conduction therethrough, a first transistor bias circuit electrically interconnected with said first transistor for biasing said first transistor conductive when said movable contact engages one said stationary contact and a second transistor bias circuit electrically interconnected with said second transistor for biasing said second transistor conductive when said movable contact engages the other one said stationary contact.

2. A reversing control for selectively reversing the direction of rotation of the armature of a permanent magnet type direct-current electric motor comprising in combination with a direct-current supply potential source having positive and negative polarity terminals, a single-pole, double throw three position electric switch having two stationary contacts and a movable contact operable to a first position to engage and to establish electrical contact with one of said stationary contacts, to a second position to engage and to establish electrical contact with the other one of said stationary contacts and to a third open position, means for connecting said movable contact to a selected one polarity terminal of said direct-current supply potential source, first and second diodes, means for connecting said first diode between one of said stationary contacts of said electric switch and one side of said motor armature and poled for forward conduction therethrough, means for connecting said second diode between the other one of said stationary contacts of said electric switch and the other side of said motor armature and poled for forward conduction therethrough, a first transistor having a base and two current carrying electrodes, first and second resistors, means for connecting said first and second resistors in series across a junction between said second diode and the said stationary contact of said electric switch to which it is connected and the other polarity terminal of said direct current supply potential source, means for connecting said current carrying electrodes of said first transistor across the side of said motor armature to which said second diode is connected and the other polarity terminal of said direct-current supply potential source, means for connecting said base electrode of said first transistor to a junction between said first and second resistors, a second transistor having a base and two current carrying electrodes, third and fourth resistors, means for connecting said third and fourth resistors in series across a junction between said first diode and the said stationary contact of said electric switch to which it is connected and the other polarity terminal of said direct current supply potential source, means for connecting said current carrying electrodes of said second transistor across the other side of said motor armature and the other polarity terminal of said direct current supply potential source and means for connecting said base electrode of said second transistor to a junction between said third and fourth resistors.

3. A reversing control for selectively reversing the direction of rotation of the armature of a permanent magnet type direct current electric motor comprising in combination with a direct current supply potential source having positive and negative polarity terminals, a single-pole, double throw three position electric switch having two stationary contacts and a movable contact operable to a first position to engage and to establish electrical contact with one of said stationary contacts, to a second position to engage and to establish electrical contact with the other one of said stationary contacts and to a third open position, means for connecting said movable contact to a selected one polarity terminal of said direct current supply potential source, first and second diodes, means for connecting said first diode between one of said stationary contacts of said electric switch and one side of said motor armature and poled for forward conduction therethrough, means for connecting said second diode between the other one of said stationary contacts of said electric switch and the other side of said motor armature and poled for forward conduction therethrough, a first transistor having a base and two current carrying electrodes, first and second resistors, means for connecting said first and second resistors in series across a junction between said first diode and the said stationary contact of said electric switch to which it is connected and the other polarity terminal of said direct-current supply potential source, means for connecting said current carrying electrodes of said first transistor across the side of said motor armature to which said second diode is connected and the other polarity terminal of said direct-current supply potential source, means for connecting said base electrode of said first transistor to a junction between said first and second resistors, a second transistor having a base and two current carrying electrodes, third and fourth resistors, means for connecting said third and fourth resistors in series across a junction between said second diode and the said stationary contact of said electric switch to which it is connected and the other polarity terminal of said direct current supply potential source, means for connecting said current carrying electrodes of said second transistor across the other side of said motor armature and the other polarity terminal of said direct-current supply potential source and means for connecting said base electrode of said second transistor to a junction between said third and fourth resistors.